(12) United States Patent
Shimizu et al.

(10) Patent No.: US 11,479,173 B2
(45) Date of Patent: Oct. 25, 2022

(54) DRIVING ASSISTANCE APPARATUS

(71) Applicants: DENSO CORPORATION, Kariya (JP); TOYOTA JIDOSHA KABUSHIKI KAISHA, Toyota (JP)

(72) Inventors: Naotsugu Shimizu, Kariya (JP); Koji Takeuchi, Toyota (JP); Iwao Izumikawa, Toyota (JP); Masaki Kawakami, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/239,069

(22) Filed: Apr. 23, 2021

(65) Prior Publication Data

US 2021/0300243 A1     Sep. 30, 2021

Related U.S. Application Data

(63) Continuation of application No. PCT/JP2019/041701, filed on Oct. 24, 2019.

(30) Foreign Application Priority Data

Oct. 26, 2018   (JP) .............................. JP2018-202106

(51) Int. Cl.
*B60Q 9/00*     (2006.01)
*G08G 1/16*     (2006.01)

(52) U.S. Cl.
CPC ............... *B60Q 9/008* (2013.01); *G08G 1/16* (2013.01)

(58) Field of Classification Search
None
See application file for complete search history.

(56) References Cited

U.S. PATENT DOCUMENTS

| | | | | |
|---|---|---|---|---|
| 5,767,793 | A * | 6/1998 | Agravante | H01Q 21/205 340/901 |
| 9,591,024 | B2 * | 3/2017 | Stählin | H04L 67/12 |
| 9,672,736 | B2 * | 6/2017 | Lovell | G08G 1/164 |
| 9,740,211 | B2 * | 8/2017 | Nordbruch | G08G 1/168 |
| 10,421,398 | B2 * | 9/2019 | Igarashi | G08G 1/166 |

(Continued)

FOREIGN PATENT DOCUMENTS

| | | | |
|---|---|---|---|
| JP | 10-166975 | A | 6/1998 |
| JP | 10166975 | A * | 6/1998 |

(Continued)

*Primary Examiner* — Muhammad Adnan
(74) *Attorney, Agent, or Firm* — Maschoff Brennan

(57) ABSTRACT

In a driving assistance apparatus, an area setter is configured to set a warning area on at least one of a left rear side and a right rear side of a subject vehicle. A notifier is configured to provide a notification in response to an object detector detecting an object in the warning area. A determiner is configured to determine initiation and completion of a turn at an intersection during turning of the subject vehicle at the intersection. An area changer is configured to, in response to the determiner determining the initiation of the turn, reduce the warning area in a direction approaching the subject vehicle, and in response to the determiner determining the completion of the turn, expand the reduced warning area according to a traveling state of the subject vehicle after the completion of the turn.

9 Claims, 5 Drawing Sheets

(56) References Cited

U.S. PATENT DOCUMENTS

| | | | | |
|---|---|---|---|---|
| 10,643,474 | B2* | 5/2020 | Yamada | B60R 1/00 |
| 11,186,275 | B2* | 11/2021 | Ohmura | B60W 30/16 |
| 2003/0069695 | A1* | 4/2003 | Imanishi | G01S 11/12 |
| | | | | 348/148 |
| 2007/0013497 | A1* | 1/2007 | Watanabe | G01S 7/4004 |
| | | | | 340/435 |
| 2009/0256698 | A1* | 10/2009 | Bonilla | B60Q 1/44 |
| | | | | 340/479 |
| 2011/0025848 | A1* | 2/2011 | Yumiba | B60R 1/00 |
| | | | | 348/148 |
| 2014/0169630 | A1* | 6/2014 | Fukata | B60R 1/002 |
| | | | | 382/103 |
| 2015/0329044 | A1* | 11/2015 | Bernstein | G08G 1/165 |
| | | | | 340/435 |
| 2017/0116856 | A1* | 4/2017 | Muto | G08G 1/166 |
| 2018/0082589 | A1* | 3/2018 | Park | B60W 30/0956 |
| 2018/0174462 | A1* | 6/2018 | Um | B60W 30/09 |
| 2018/0211536 | A1* | 7/2018 | Akamine | G08G 1/166 |
| 2018/0247538 | A1* | 8/2018 | Baek | B60W 30/0953 |
| 2018/0366002 | A1* | 12/2018 | Rothmund | B60W 30/18163 |
| 2019/0196480 | A1* | 6/2019 | Taylor | G05D 1/0088 |
| 2020/0070818 | A1* | 3/2020 | Tominaga | B60W 30/16 |
| 2020/0193831 | A1* | 6/2020 | Hassan-Shafique | G06T 7/20 |
| 2021/0024059 | A1* | 1/2021 | Miyamoto | B60W 10/184 |
| 2021/0237735 | A1* | 8/2021 | Ha | G08G 1/166 |
| 2021/0268998 | A1* | 9/2021 | Brickwedde | B60W 30/0953 |

FOREIGN PATENT DOCUMENTS

| | | | | |
|---|---|---|---|---|
| JP | 2005-310010 | A | | 11/2005 |
| JP | 2006-048409 | A | | 2/2006 |
| JP | 2010-15450 | A | | 1/2010 |
| JP | 2010015450 | A | * | 1/2010 |
| JP | 2011-43995 | A | | 3/2011 |
| JP | 2011-123734 | A | | 6/2011 |
| JP | 2012-243069 | A | | 12/2012 |
| JP | 2013-105201 | A | | 5/2013 |
| JP | 2014-16889 | A | | 1/2014 |
| JP | 5862670 | B2 | | 2/2016 |

* cited by examiner

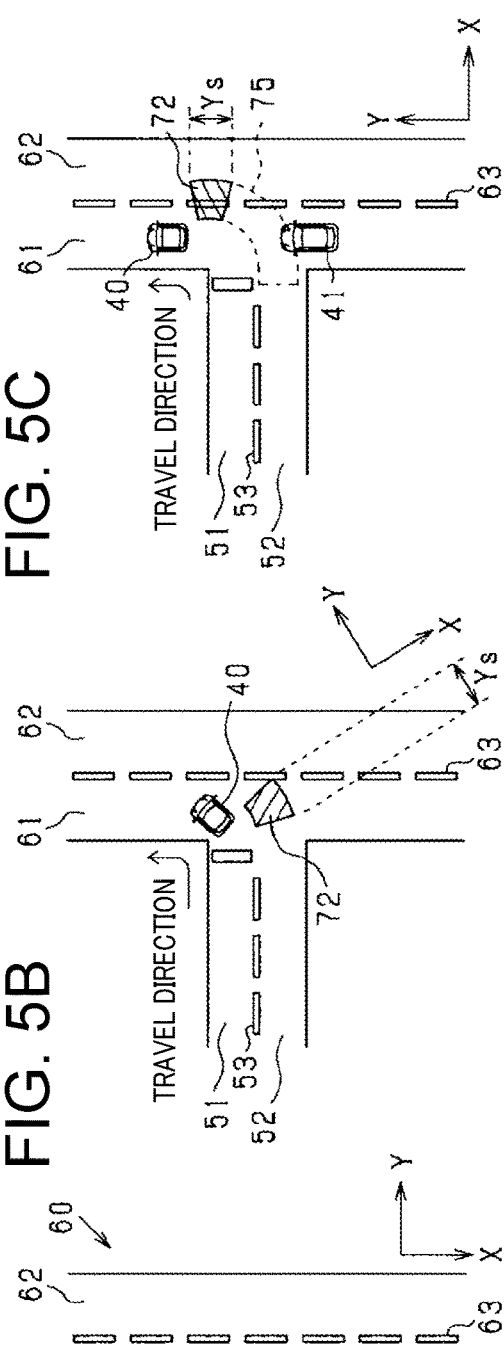
FIG. 5A
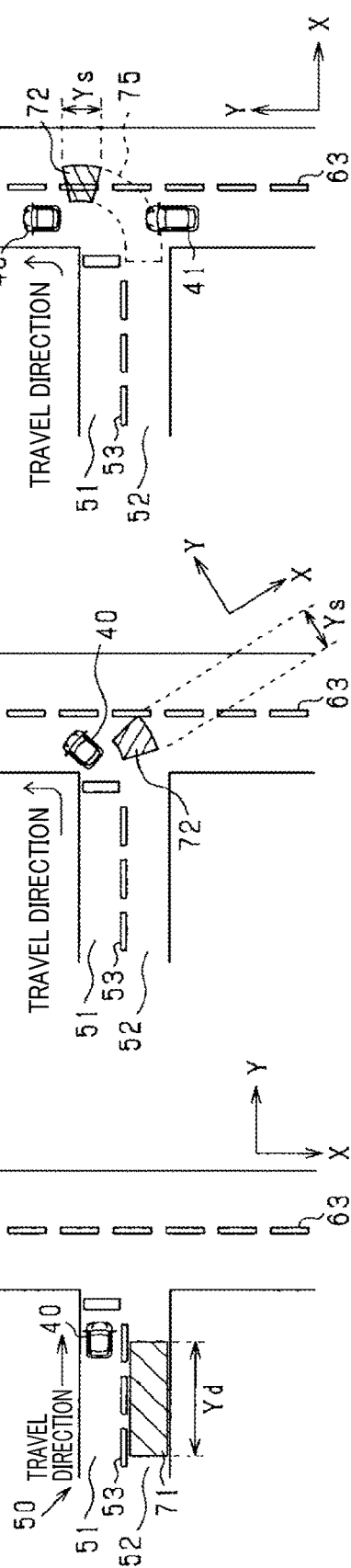
FIG. 5B
FIG. 5C
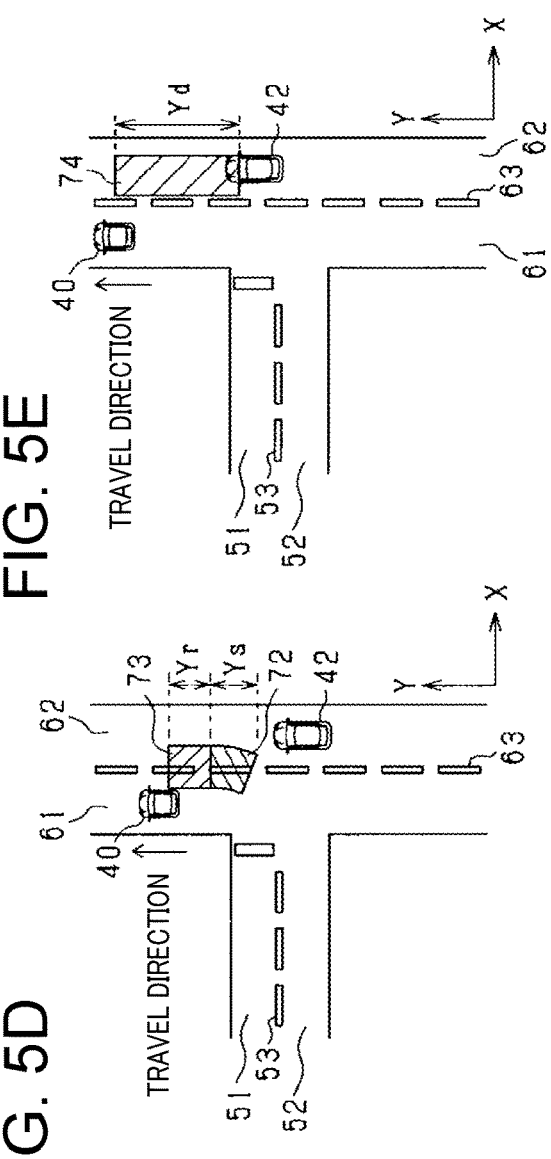
FIG. 5D
FIG. 5E

DRIVING ASSISTANCE APPARATUS

CROSS-REFERENCE TO RELATED APPLICATION

This application is based on Japanese Application No. 2018-202106 filed on Oct. 26, 2018, the contents of which are incorporated herein by reference.

BACKGROUND

Technical Field

This disclosure relates to a driving assistance apparatus for performing driving assistance based on object detection information around a vehicle.

Related Art

A system is known for detecting a vehicle other than a subject vehicle, which comes close to the subject vehicle from behind on an adjacent lane, and providing a notification thereof. This system is configured to, in response to recognizing that the subject vehicle is turning at an intersection, reduce a warning area on a side opposite a turn direction of the subject vehicle toward a direction in which the other vehicle is approaching the subject vehicle, thereby suppressing an unnecessary notification provided in response to detection of a vehicle traveling straight on a side opposite a turn direction of the subject vehicle. The warning area is an area such that a notification is to be provided in response to detection of an object that has entered this area.

BRIEF DESCRIPTION OF THE DRAWINGS

In the accompanying drawings:

FIG. 5A is an illustration of warning area changes when the subject vehicle enters an intersection and initiates a turn to when the subject vehicle completes the turn and leaves the intersection;

FIG. 5B is another illustration of warning area changes when the subject vehicle enters an intersection and initiates a turn to when the subject vehicle completes the turn and leaves the intersection;

FIG. 5C is another illustration of warning area changes when the subject vehicle enters an intersection and initiates a turn to when the subject vehicle completes the turn and leaves the intersection;

FIG. 5D is another illustration of warning area changes when the subject vehicle enters an intersection and initiates a turn to when the subject vehicle completes the turn and leaves the intersection;

FIG. 5E is another illustration of warning area changes when the subject vehicle enters an intersection and initiates a turn to when the subject vehicle completes the turn and leaves the intersection;

DESCRIPTION OF SPECIFIC EMBODIMENTS

Figure 1:
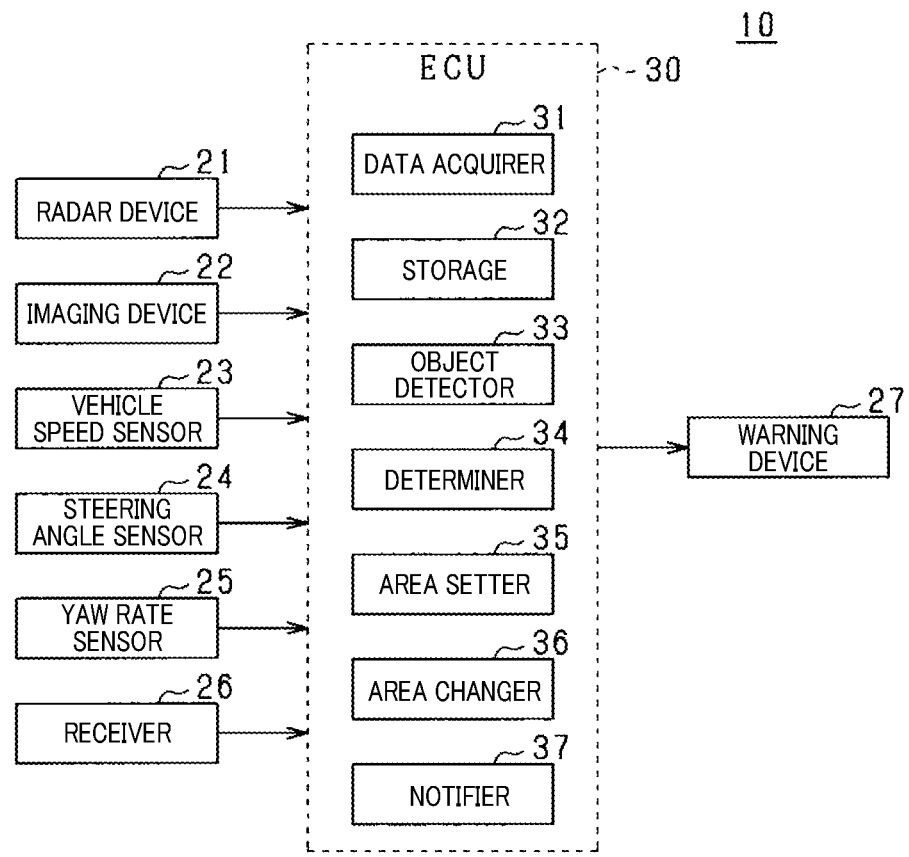
FIG. 1 is a block diagram of a driving assistance apparatus according to one embodiment.

With the known system set forth above, as disclosed in JP-A-2012-243069, unnecessary notifications can be suppressed during turning of the subject vehicle at an intersection. However, the subject vehicle that has entered the intersection to make a right or left turn from a normal traveling state will leave the intersection in response to completion of the turn and return to the normal traveling state. If the warning area is left reduced in response to leaving the intersection and retuning to the normal traveling state, it is difficult to adequately detect a vehicle that is approaching the subject vehicle and provide a notification thereof. Thus, there is a concern about driving safety of the subject vehicle.

In view of the foregoing, it is desired to have a driving assistance apparatus that can adequately detect and provide a notification of an object around a subject vehicle throughout a time period from when the subject vehicle enters an intersection to when the subject vehicle leaves the intersection and returns to a normal traveling state.

The present disclosure provides a driving assistance apparatus including an object detector configured to detect an object on at least one of a left rear side and a right rear side of a subject vehicle, an area setter configured to set a warning area on at least one of the left rear side and the right rear side of the subject vehicle, a notifier configured to provide a notification in response to the object detector detecting an object in the warning area, a determiner configured to determine initiation and completion of a turn at an intersection during turning of the subject vehicle at the intersection, and an area changer configured to, in response to the determiner determining the initiation of the turn, reduce the warning area in a direction approaching the subject vehicle, and in response to the determiner determining the completion of the turn, expand the reduced warning area according to a traveling state of the subject vehicle after the completion of the turn.

With this disclosure, in response to the determiner determining initiation of the turn, the area changer reduces the warning area in a direction approaching the subject vehicle. This can suppress unnecessary notifications. In addition, in response to the determiner determining the completion of the turn after determining the initiation of the turn, the area changer expands the reduced warning area according to a traveling state (e.g., a travel speed, a travel distance, a travel time or the like) of the subject vehicle after the completion of the turn is determined, which allows the warning area to be expanded timely and adequately while suppressing unnecessary notifications. As a result, throughout a time period from when the subject vehicle enters the intersection to when the subject vehicle leaves the intersection and returns to a normal traveling state, an object around the subject vehicle can adequately be detected, unnecessary notifications can be suppressed, and driving safety of the subject vehicle can be ensured.

As illustrated in FIG. 1, a driving assistance system 10 according to one embodiment includes a radar device 21, an imaging device 22, a vehicle speed sensor 23, a steering angle sensor 24, a yaw rate sensor 25, a receiver 26, a warning device 27, and an electronic control unit (ECU) 30.

The radar device 21 is, for example, a well-known millimeter-wave radar that transmits radio-frequency signals in a millimeter waveband as transmitted waves. The radar device 21 may include a single millimeter-wave radar or a plurality of millimeter-wave radars. The radar device 21 may be installed at the rear end or the like of the subject vehicle and detect locations of objects that fall within a detection range. The detection range refers to a region of a predefined detection angle, objects falling in which can be detected. More specifically, the radar device 21 transmits a probe wave every predetermined time interval and receives a reflected wave of the probe wave via a plurality of antennas, and calculates a distance between the subject vehicle and the object based on the probe wave transmission time and the reflected wave reception time. The radar device 21 calculates a relative speed of the object relative to the subject vehicle based on frequency changes caused by the doppler effect. In addition, the radar device 21 calculates an azimuth angle of the object based on a phase difference between the reflected waves received at the plurality of antennas. Once the location and the azimuth of the object are successfully calculated, a relative position of the object to the subject vehicle can be determined.

The imaging device 22 may be a monocular camera, such as a charge-coupled device (CCD) camera, a complementary metal-oxide semiconductor (CMOS) image sensor, a near-infrared camera or the like, or may be a stereo camera. The subject vehicle may be equipped with one imaging device 22 or may be equipped with multiple imaging devices 22. The imaging device 22 may be disposed at a vehicle-widthwise center and at a predetermined height to capture, from an overhead perspective, images of a region that horizontally spans a pre-defined range of angles from a forward or backward looking imaging axis of the camera. The imaging device 22 extracts feature points indicative of presence of an object in the images. More specifically, the imaging device 22 extracts edge points based on brightness information of captured images, applies a Hough transform or the like to the extracted edge points. In the Hough transform, feature points to be extracted include points on a straight line with a plurality of consecutive edge points and points at which two lines bisect at right angles. The imaging device 22 outputs to the ECU 30 sensing information including a sequence of captured images.

The radar device 21 and the imaging device 22 are example surroundings monitoring devices that acquire surroundings information which is information about surroundings of the subject vehicle. Other example surroundings monitoring devices may include sensors that transmit probe waves, such as an ultrasonic sensor, light detection and ranging (LIDAR) and the like. The sensors that transmit probe waves, such as a millimeter-wave radar used as the radar device 21, a sonar, LIDAR and the like, sequentially output to the ECU 30 sensing information including results of scanning based on received signals acquired in response to receipt of reflected waves from obstacles.

Figure 2:
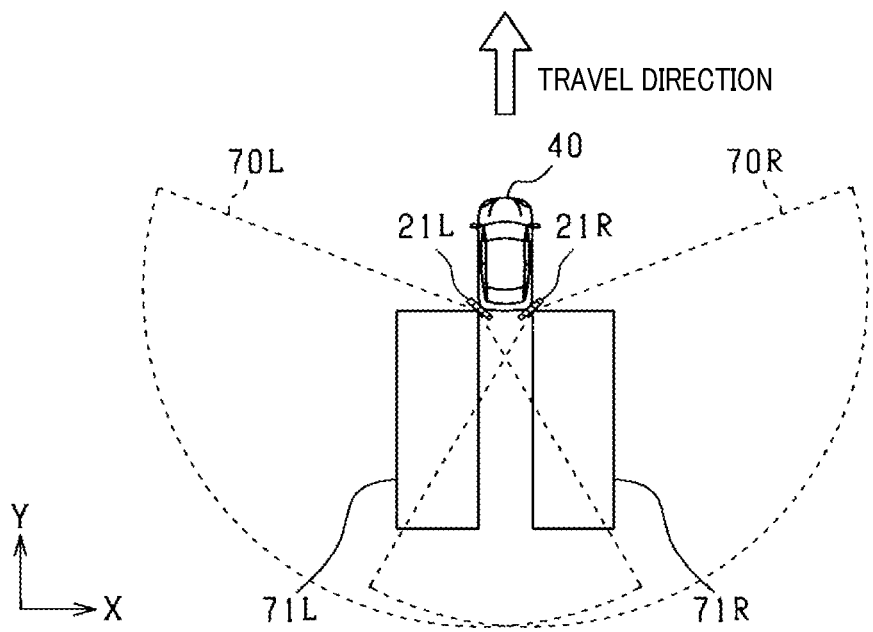
FIG. 2 is an example of a positional relationship between a subject vehicle and warning areas.

As illustrated in FIG. 2, the radar device 21 is disposed at each of the right rear end and the left rear end of the subject vehicle 40, which enables detection of objects in rearward and lateral rearward areas of the subject vehicle 40. The radar device 21L disposed at the left rear end of the subject vehicle 40 can detect objects in a detection area 70L. The radar device 21R disposed at the right rear end of the subject vehicle 40 can detect objects in a detection area 70R.

The various surroundings monitoring devices set forth above may be configured to detect not only objects in the rearward and lateral rearward areas of the subject vehicle 40, but also objects in forward and lateral forward areas of the subject vehicle 40, and use results of detection as location information. Objects to be monitored may be changed depending on a type of each surroundings monitoring device. For example, preferably, when the imaging device 22 is used, stationary objects, such as road signs and buildings, may be monitored. When the radar device 21 is used, objects having large reflected power therefrom may be monitored. The surroundings monitoring devices to be used may be selected depending on a type, a location, or a movement speed of an object to be monitored.

The vehicle speed sensor 23 is a sensor configured to detect a travel speed of the subject vehicle 40, and may include, but is not limited to, a wheel speed sensor that can detect a rotational speed of a wheel. The wheel speed sensor used as the vehicle speed sensor 23 may be attached to a wheel part and output to the ECU 30 a wheel speed signal responsive to a wheel speed of the subject vehicle.

The steering angle sensor 24 may be attached to a steering rod of the subject vehicle and output to the ECU 30 a steering angle signal responsive to a change in steering angle of the steering wheel associated with the driver's operation.

The subject vehicle may be equipped with one yaw rate sensor 25 or may be equipped with multiple yaw rate sensors 25. In a case where one yaw rate sensor 25 is installed, the yaw rate sensor 25 may be disposed in the middle position of the subject vehicle to output to the ECU 30 a yaw rate signal responsive to a rate of change in amount of steering of the subject vehicle 40. In a case where multiple yaw rate sensors 25 are installed, an average over or a mean between a plurality of sensed values of yaw rate may be used. In calculation of the average over the plurality of sensed values of yaw rate is calculated, the sensed values of yaw rate may be weighted.

The receiver 26 is, as an example, a global navigation satellite system (GNSS) receiver, which can receive positioning signals from a satellite positioning system using satellites to determine a current ground location.

The warning device 27 is configured to provide a notification to the driver or the like. The warning device 27 may be a device that provides an audible notification, such as a speaker, a buzzer, or the like, or a device that provides a visible notification, such as a display, installed in a passenger compartment of the subject vehicle 40. The warning device 27 outputs a warning sound or the like in response to a control command from the ECU 30 to notify the driver that the subject vehicle is in danger of colliding with an object.

The ECU 30 includes a data acquirer 31, a storage 32, an object detector 33, a determiner 34, an area setter 35, an area changer 36, and a notifier 37. The ECU 30 includes a central processing unit (CPU), a read-only memory (ROM), a random-access memory (RAM), an input-output interface (I/O) and other components. The CPU implements these functions by executing programs installed in the ROM. The ECU 30 generates and outputs a control command to the warning device 27 based on the information acquired from the radar device 21, the imaging device 22, the vehicle speed sensor 23, the steering angle sensor 24, the yaw rate sensor 25, and the receiver 26, thereby serving as the driving assistance apparatus that performs driving assistance of the subject vehicle 40.

The data acquirer 31 acquires sensed data acquired by the radar device 21, the imaging device 22, and the various sensors 23 to 25, and positioning signals received by the receiver 26.

The storage 32 stores various data acquired by the data acquirer 31 and values calculated based on the various data. The storage 32 can also store, as a turn curve history, a history of curve radii when the subject vehicle 40 turns at an intersection. The intersection means an intersection of two or more roads, such as a crossroad, a T-junction, or the like (in the case of a road having a sidewalk and a roadway distinct from each other, an intersection with the roadway). The turn curve history may be a history of curve radii that are stored throughout a time period from when the subject vehicle 40 enters an intersection to when the subject vehicle leaves the intersection and returns to a normal traveling state. Further, the turn curve history may be updated or have a new one added, as appropriate. The turn curve history may be stored in association with a location and a form (such as a shape, dimensions and the like) of each intersection.

The object detector 33 can detect or sense objects in at least one of the left lateral rearward area and the right lateral rearward area of the subject vehicle 40 based on sensed data acquired from the surroundings monitoring devices, such as the radar device 21, the imaging device 22 and the like. For example, as illustrated in FIG. 2, the object detector 33 can detect objects that are present in at least one of the left lateral rearward area and the right lateral rearward area of the subject vehicle 40 based on data regarding object information detected in the detection areas 70L, 70R of the radar devices 21L, 21R.

The determiner 34 determines initiation and completion of a turn at an intersection where the subject vehicle 40 is turning. Preferably, the determiner 34 may be configured to determine initiation and completion of a turn at an intersection where the subject vehicle 40 is turning, based on the turn curve history stored in the storage 32 and the current curve radius of the subject vehicle 40. The determiner 34 may be configured to read the turn curve history specific to the intersection at which the subject vehicle is turning, based on the current location information, surroundings information or other information of the subject vehicle 40. The determiner 34 can calculate the current curve radius R of the subject vehicle 40 based on sensed values from the vehicle speed sensor 23, the steering angle sensor 24, the yaw rate sensor 25 or others.

For example, the determiner 34 may read a specific curve radius as an initiation-of-turn curve radius Rs or a completion-of-turn curve radius Re based on the turn curve history stored in the storage 32 and compare the initiation-of-turn curve radius Rs or the completion-of-turn curve radius Re with the current curve radius R of the subject vehicle 40, thereby determining initiation of the turn or completion of the turn. This enables a quick determination suitable for the current traveling state of the subject vehicle 40. As a result, it is possible to set or change the warning area suitable for the current traveling state of the subject vehicle 40. The initiation-of-turn curve radius Rs and the completion-of-turn curve radius Re may be set to different values (Re>Rs or Re<Rs) or may be set to be equal (Rs=Re).

For example, the determiner 34 may acquire the curve radius R of the subject vehicle 40 when actually traveling, and compare it with the read initiation-of-turn curve radius Rs. When R≤Rs is satisfied, the determiner 34 may determine that the subject vehicle 40 has initiated a turn at an intersection. Alternatively, the determiner 34 may count when R≤Rs is satisfied, every determination processing cycle. When it is consecutively determined over a predetermined number of cycles or more that R≤Rs is satisfied, the determiner 34 may determine that the subject vehicle 40 has initiated a turn at an intersection.

In addition, the determiner 34 may acquire the curve radius R of the subject vehicle 40 when actually traveling, and compare it with the read completion-of-turn curve radius Re. When R>Re is satisfied, the determiner 34 may determine that the subject vehicle 40 has completed the turn at the intersection. Alternatively, the determiner 34 may count when R>Re is satisfied, every determination processing cycle. When it is consecutively determined over a predetermined number of cycles or more that R>Re is satisfied, the determiner 34 may determine that the subject vehicle 40 has completed the turn at the intersection.

The determiner 34 may be configured to determine initiation and completion of the turn of the subject vehicle 40 by additionally using information other than the turn curve history stored in the storage 32. For example, object information around the subject vehicle 40 acquired from the imaging device 22 (for example, surrounding vehicles, pedestrians, road markings such as line markings, road signs, and others), location information, geographic information, traffic information and other information acquired from receiver 26 may be used in combination with the turn curve radius to determine initiation and completion of the turn of the subject vehicle 40.

The area setter 35 sets a warning area on at least one of the left rear side and the right rear side of the subject vehicle 40. The warning area is set as an area for providing a notification in response to detection of an object that has entered the area. The warning area may possess any shape and dimensions within the detection area of the radar device 21. Preferably, like the warning areas 71L and 71R illustrated in FIG. 2, the warning area may be a strip-shaped area possessing a width of about the order of lane width on each of the left rear side and the right rear side of the subject vehicle 40.

For example, as illustrated in FIG. 2, the area setter 35 sets, within the detection area 70L for the radar device 21L, a strip-shaped warning area 71L that extends from the left rear end of the subject vehicle 40 backward along the travel direction (indicated by the Y-axis in FIG. 2) and leftward along the lateral direction (indicated by the X-axis in FIG. 2). The area setter 35 further sets, within the detection area 70R for the radar device 21R, a strip-shaped warning area 71R that extends from the right rear end of the subject vehicle 40 backward along the travel direction and rightward along the lateral direction. The area setter 35 may set either or both of the warning area 71L on the left rear side of the subject vehicle 40 and the warning area 71R on the right rear side. For example, the warning area may be set only on the adjacent lane side to the lane in which the subject vehicle 40 is traveling.

The area setter 35 may set the warning area by using information around the subject vehicle 40 acquired from the imaging device 22, such as road markings, road signs and the like, and location information, geographic information, traffic information and the like of the subject vehicle 40 acquired from the receiver 26.

The area changer 36 reduces the warning area in a direction approaching the subject vehicle 40 in response to the determiner 34 determining the initiation of a turn. Reducing the warning area enables suppression of unnecessary notifications that may be provided in response to a vehicle, other than the subject vehicle, entering a warning area set at an inadequate position, e.g., in a lane of the turn destination. In response to the determiner 34 determining the completion of the turn after the initiation of the turn of the subject vehicle 40, the area changer 36 expands the warning area reduced after initiation of the turn, based on a traveling state of the subject vehicle 40 after the completion of the turn. By expanding the reduced warning area according to the traveling state of the subject vehicle 40, the reduced warning area can timely and adequately be expanded while suppressing unnecessary notifications that may be provided in response to a vehicle, other than the subject vehicle, entering a warning area set at an inadequate position.

The area changer 36 is preferably configured to implement changes in dimensions (reduction or expansion) of a warning area set on the right rear side of the subject vehicle 40 that is a side opposite a direction of a turn of the subject vehicle 40 at an intersection. More specifically, preferably, the area changer 36 changes a warning area set on the right rear side of the subject vehicle 40 when the subject vehicle 40 makes a left turn at an intersection (when it turns to the left), and changes a warning area set on the left rear side of the subject vehicle 40 when the subject vehicle 40 makes a right turn at an intersection (when it turns to the right).

The direction in which the area changer 36 reduces the warning area may be a direction approaching the subject vehicle 40. For example, it may be the travel direction of the subject vehicle 40 (that is the direction indicated by the Y-axis in FIG. 2) or the lateral direction of the subject vehicle 40 (that is the direction indicated by the X-axis in FIG. 2). The direction in which the area changer 36 expands the warning area may be a direction away from the subject vehicle 40, which is a direction opposite the direction in which the warning area is reduced. Preferably, the area changer 36 may, before the subject vehicle 40 returns to the normal traveling state, expand the warning area such that the warning area possesses the same dimensions and the same positional relationship with the subject vehicle 40 as before reduction.

The area changer 36 may reduce the warning area to predetermined dimensions at the time that initiation of a turn is determined by the determiner 34, or may reduce the warning area stepwise during a time period from when the subject vehicle 40 initiates a turn to when the subject vehicle 40 completes the turn.

The area changer 36 may determine a direction in which a warning area is changed and the extent to which a warning area is changed, using information around the subject vehicle 40, such as road markings, road signs and the like, acquired from the imaging device 22, and location information of the subject vehicle 40, geographic information, traffic information and other information acquired from receiver 26. For example, during turning at an intersection, the warning area may, based on line markings recognized by the imaging device 22, be reduced so as to not be set in a lane of the subject vehicle 40, thereby suppressing notifications provided in response to a vehicle other than the subject vehicle 40 traveling in the lane of the subject vehicle 40 being detected.

The area changer 36 may be configured to, in response to the determiner 34 determining the completion of the turn, expand the reduced warning area according to at least one of a travel distance, a travel time, a travel speed of the subject vehicle 40 after the completion of the turn. The travel distance, the travel time, the travel speed of the subject vehicle 40 are example parameters indicating a traveling state of the subject vehicle 40. Other example parameters indicating a traveling state of the subject vehicle 40 (e.g., an acceleration and the like of the subject vehicle 40, detectable by an acceleration sensor) may be used.

The greater the travel distance traveled by the subject vehicle 40 after completion of a turn, the closer the traveling state of the subject vehicle 40 is to the normal traveling state. The greater the travel time traveled by the subject vehicle 40 after completion of a turn, the closer the traveling state of the subject vehicle 40 is to the normal traveling state. The higher the traveling speed of the subject vehicle 40 after completion of a turn, the closer the traveling state of the subject vehicle 40 is to the normal traveling state.

Therefore, the greater the travel distance or the travel time traveled by the subject vehicle 40 after the completion of the turn, or the higher the travel speed of the subject vehicle 40 after the completion of the turn, the more the warning area is expanded. This allows the warning area to be expanded before the subject vehicle 40 returns to the normal traveling state while avoiding unnecessary notifications. The area changer 36 may expand the warning area in a stepwise manner or in a smooth manner (linearly or curvilinearly), as the travel speed, the travel distance, or the travel time of the subject vehicle 40 increases.

Alternatively, the area changer 36 may set, for parameters indicating the traveling state of the subject vehicle 40, expansion-execution thresholds for expanding the warning area, and expand the warning area according to the travel speed and others exceeding the expansion-execution thresholds. For example, the area changer 36 sets, for the travel speed, the travel distance, and the travel time of the subject vehicle 40, their expansion-execution thresholds (i.e., an expansion-execution speed, an expansion-execution distance, and an expansion-execution time) for expanding the warning area. The area changer 36 may expand the warning area in response to the travel speed, the travel distance, and the travel time respectively exceeding the expansion-execution speed, the expansion-execution distance, and the expansion-execution time. Setting the expansion-execution thresholds allows expansion of the warning area to be delayed until the traveling state of the subject vehicle 40 meets a predetermined condition, even after completion of the turn is determined. The expansion-execution thresholds may be set based on forms of intersections, surroundings information, geographic information and other information.

The expansion-execution thresholds may be set for the parameters indicating the traveling state of the subject vehicle 40, one for each parameter. Alternatively, a plurality of expansion-execution thresholds may be set for each of the parameters indicating the traveling state of the subject vehicle 40. For example, one expansion-execution speed may be set for the travel speed of the subject vehicle 40. In response to the travel speed of subject vehicle 40 exceeding this expansion-execution speed, the warning area may be expanded and returned to the initially sized warning area that applied before reduction of the warning area. Instead, a plurality of different expansion-execution speeds may be set for the travel speed of the subject vehicle 40. The warning area may be more expanded as the travel speed of the subject vehicle 40 exceeds a higher expansion-execution threshold. More specifically, given a first expansion-execution speed, a second expansion-execution speed, and a third expansion-execution speed in ascending order, the warning area may be expanded by a predetermined amount according to the travel speed of the subject vehicle 40 exceeding the first expansion-execution speed. The warning area may further be expanded according to the travel speed of the subject vehicle 40 exceeding the second expansion-execution speed. The warning area may be expanded and returned to the initially sized warning area that applied before reduction of the warning area in response to the travel speed of the subject vehicle 40 exceeding the third expansion-execution speed.

In response to the object detector 33 detecting an object in the warning area, the notifier 37 commands the warning device 27 to provide a notification. Although not shown, driving control (e.g., collision avoidance control) of the subject vehicle 40 may be performed together with notification.

Figure 3:
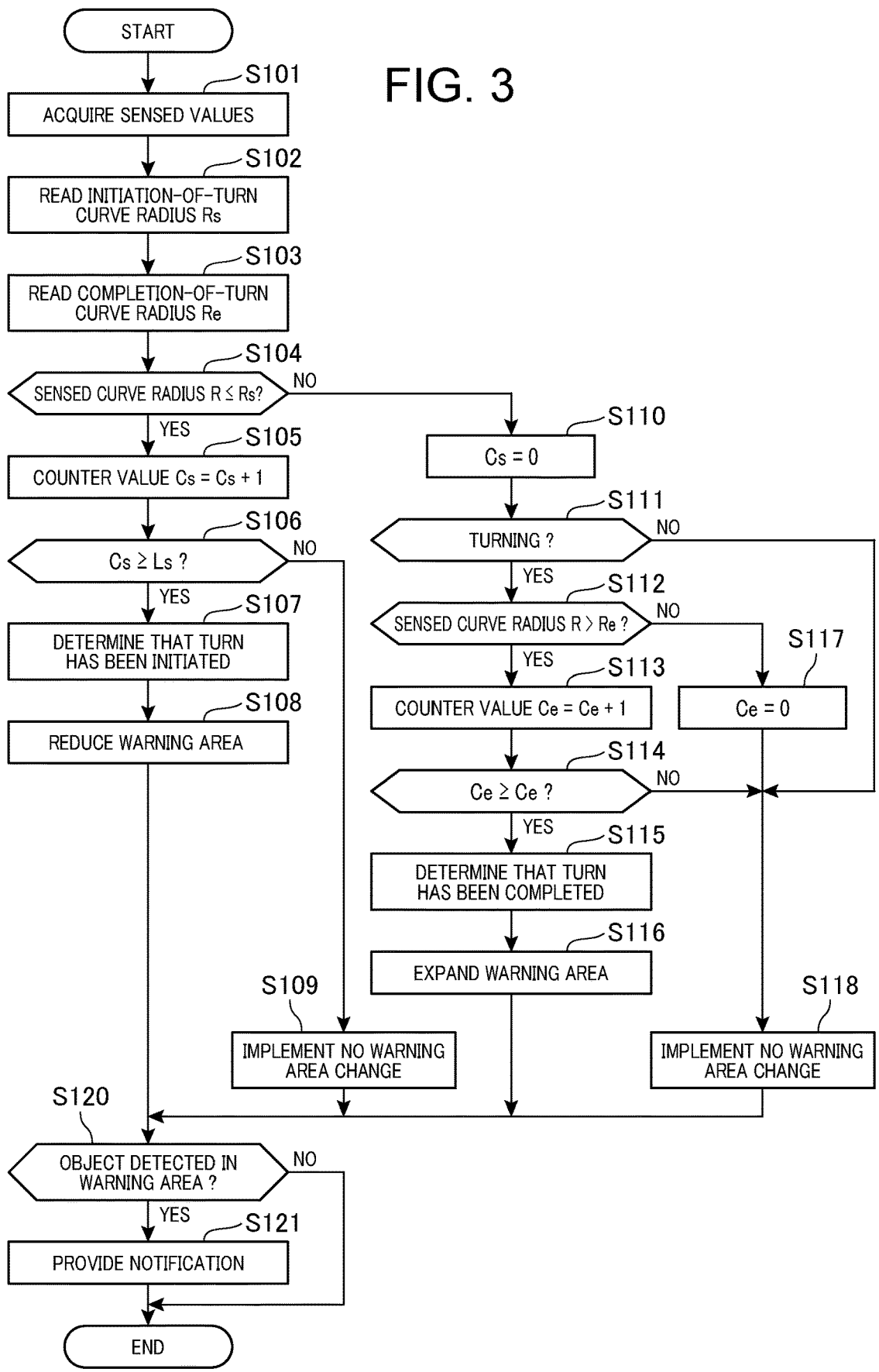
FIG. 3 is a flowchart of driving assistance control performed by an ECU.

The driving assistance control performed by the ECU 30 will be described using the flow chart in FIG. 3. The process illustrated in FIG. 3 is repeatedly performed every predetermined time interval during driving of the subject vehicle 40.

At step S101, sensed values from various sensors, positioning information and the like are acquired as appropriate from the radar device 21, the imaging device 22, the vehicle speed sensor 23, the steering angle sensor 24, the yaw rate sensor 25, and the receiver 26. The process flow then proceeds to step S102.

At step S102, the initiation-of-turn curve radius Rs is read from the turn curve history stored in the ECU 30. Subsequently, at step S103, the completion-of-turn curve radius Re is read from the turn curve history stored in the ECU 30. The process flow then proceeds to step S104.

At step S104, it is determined whether the curve radius R of the subject vehicle 40 acquired based on sensed values from the steering angle sensor 24 and the like is equal to or less than the initiation-of-turn curve radius Rs. If R Rs, the process flow proceeds to S105, where the value of initiation-of-turn counter Cs is incremented, that is, Cs=Cs+1. The process flow then proceeds to step S106. If R>Rs. The process flow proceeds to step S110, where the value of initiation-of-turn counter Cs is reset, that is, Cs=0. The process flow then proceeds to S111.

At step S106, it is determined whether the value of initiation-of-turn counter Cs is equal to or greater than a predetermined counter threshold Ls. If it is determined at step S104 over consecutive Ls cycles that R≤Rs, the condition that Cs≥Ls is met at step S106. If Cs≥Ls, the process flow proceeds to step S107, where it is determined that the turn has been initiated. The process flow further proceeds to step S108 to perform reduction of the warning area. At step S108, for example, at the time it is determined that the turn has been initiated, the warning area may be reduced to predetermined dimensions in one step. Instead, the warning area may be gradually reduced to predetermined dimensions according to an elapsed time from the initiation of the turn, the traveling state of the traveling state of the subject vehicle 40, the object information around the subject vehicle 40 and the like. If Cs<Ls, the process flow proceeds to step S109, where a warning area change is not performed. After step S108 or S109, the process flow proceeds to step S120.

At step S111, it is determined whether the subject vehicle 40 is turning. If it was determined in a cycle before the current cycle that the turn was initiated and it has not been yet determined that the turn has been completed, it is determined that the vehicle 40 is turning. If the subject vehicle 40 is turning, the process flow proceeds to step S112. If the subject vehicle 40 is not turning, the process flow proceeds to step S118, where a warning area change is not performed.

At step S112, it is determined whether the detected curve radius R of the subject vehicle 40 exceeds the completion-of-turn curve radius Re. If R>Re, the process proceeds to step S113, where the value of completion-of-turn counter Ce is incremented, that is, Ce=Ce+1. The process flow then proceeds to step S114. If R≤Re, the process flow proceeds to step S117, where the value of completion-of-turn counter Ce is reset, that is, Ce=0. The process flow then proceeds to step S118, where a warning area change is not performed.

At step S114, it is determined whether the value of completion-of-turn counter Ce is equal to or greater than a predetermined counter threshold Le. If it is determined at step S112 over consecutive Le cycles that R>Re, the condition that Ce Le is met at step S113. If Ce≥Le, the process flow proceeds to step S115, where it is determined that the turn has been completed. The process flow further proceeds to step S116 to perform expansion of the warning area. At step S116, parameters (such as a travel distance, a travel time, a travel speed, and the like) indicating the traveling state of the subject vehicle 40 are acquired or calculated, and expansion of the warning area is thereby performed according to the traveling state. At the time it is determined that the turn has been completed, the warning area may be expanded to predetermined dimensions in one step. Instead, the warning area may be gradually expanded to predetermined dimensions according to an elapsed time from the completion of the turn, the traveling state of the traveling state of the subject vehicle 40, the object information around the subject vehicle 40 and the like. If Ce<Le, the process flow proceeds to step S118, where a warning area change is not performed. After step S116 or S118, the process flow proceeds to step S120.

At step S120, based on the warning area determined at step S108, S109, S116, or S118, a determination is made as to whether an object has been detected in the warning area. If an object has been detected in the warning area, the process flow proceeds to step to S121, where a notification-execution command is output to the warning device 27. Thereafter, one cycle of process ends. If no object has been detected in the warning area, one cycle of process ends without providing a notification.

Figure 4:
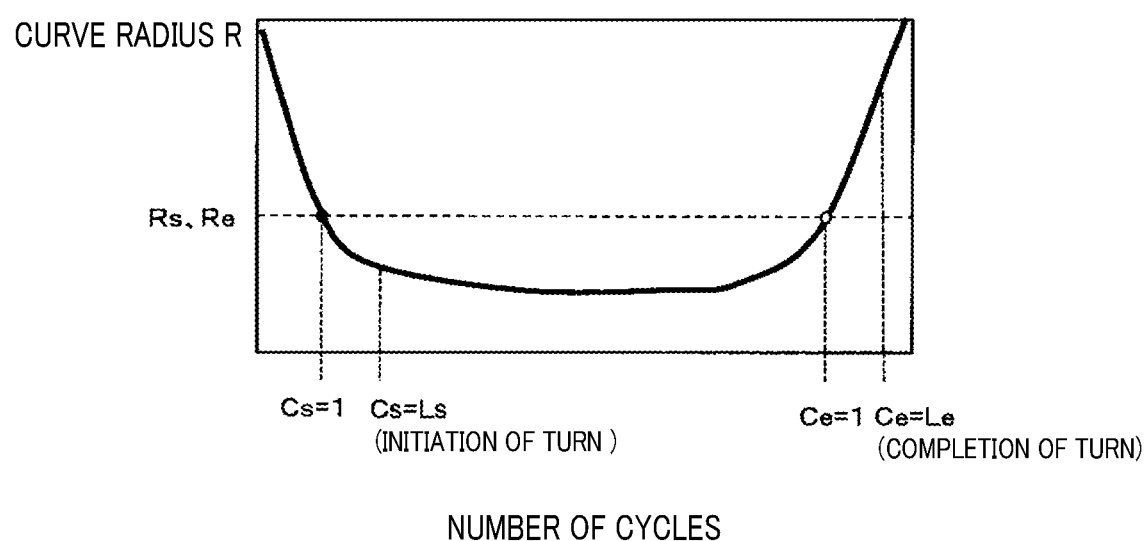
FIG. 4 is an illustration of curve radius changes during turning at an intersection.

FIG. 4 is a plot of the curve radius R of the subject vehicle 40 detected for each cycle of the driving assistance process illustrated in FIG. 3 when the subject vehicle 40 turns at an intersection. FIG. 4 illustrates a case where the initiation-of-turn curve radius Rs and the completion-of-turn curve radius Re are set equal to each other.

As the subject vehicle 40 is steered to make a turn at an intersection, the sensed curve radius R of the subject vehicle 40 calculated based on the steering angle sensor 24 and the like decreases. Upon R≤Rs being met in a certain cycle, the value of counter Cs is set to 1. As R≤Rs continues to hold in consecutive cycles, the value of counter Cs is continuously incremented. Upon Cs=Ls being met, it is determined that turning of the subject vehicle 40 has been initiated. In processing cycles during turning of the subject vehicle 40, the sensed curve radius R stays substantially constant and then increases. Upon R>Re being met in a certain cycle, the value of counter Ce is set to 1. As R>Re continues to hold in consecutive cycles, the value of counter Ce is continuously incremented. Upon Ce=Le being met, it is determined that turning of the subject vehicle 40 has been completed.

In addition, changes in the curve radius of the subject vehicle 40 as plotted in FIG. 4 are stored in the ECU 30 and allowed thereby to be used as a turn curve history. As illustrated in FIG. 4, the curve radius R detected when the subject vehicle 40 turns at an intersection significantly decreases before about initiation of the turn, stays substantially constant during turning, and significantly increases from about the completion of the turn. Therefore, preferably, the initiation-of-turn curve radius Rs is set to a value of curve radius R when the rate of decrease becomes a small value. That is, preferably, the initiation-of-turn curve radius Rs is set to a value of curve radius R at or about a falling point of inflection. The completion-of-turn curve radius Re is set to a value of curve radius R when the rate of increase becomes a large value. That is, preferably, the completion-of-turn curve radius Re is set to a value of curve radius R at or about a rising point of inflection.

FIG. 4 illustrates an example case of Re=Rs, but it is not limited thereto. Instead, taking into account thresholds As and Ae, Re<Rs may be set and adjusted such that the curve radius R detected at the time of determination that turning of the subject vehicle 40 has been initiated becomes equal to the curve radius R detected at the time of determination that turning of the subject vehicle 40 has been completed.

Changes in the warning area during the driving assistance process illustrated in FIG. 3 will be described with reference to FIG. 5. FIG. 5 illustrates changes in the warning area during turning of the subject vehicle 40 at an intersection in an example case where, after entering an intersection (T-junction), the subject vehicle 40 makes a left turn at the intersection, and then completes the turn and leaves the intersection. In FIG. 5, the Y-axis indicates the travel direction of the subject vehicle 40, and the X-axis indicates the lateral direction of the subject vehicle 40. The X-axis and the Y-axis are orthogonal to each other.

As illustrated in FIG. 5A, an intersection at which the subject vehicle 40 is about to turn is a T-junction of a two-lane road 50 with travel direction from left to right as viewed from the top and a two-lane road 60 with travel direction from below to above as viewed from the top. The road 50 has lanes 51 and 52 (whose travel directions are the same) demarcated by the line marking 53. The subject vehicle 40 is traveling in the lane 51. The road 60 has lanes 61 and 62 (with the same travel direction) demarcated by the line marking 63. A strip-shaped warning area 71 extending in the travel direction (Y-direction) of the subject vehicle 40 is set on the right rear side of the subject vehicle 40. The warning area 71 indicates a warning area in the normal traveling state in which the subject vehicle 40 travels along the lane 51. The dimension of the warning area in the Y-direction is Yd, and the dimension of the warning area in the X-direction is Xd.

As illustrated in FIG. 5B, upon the subject vehicle 40 initiating a left turn from the lane 51 toward the lane 61, the curve radius R of subject vehicle 40 becomes less than or equal to the initiation-of-turn curve radius Rs and it is then determined that a turn has been initiated. As a result, the warning area of the subject vehicle 40 is reduced in the direction approaching the subject vehicle 40 and becomes the warning area 72. The dimension of the warning area 72 is reduced to Ys in the travel direction of the subject vehicle 40 while the dimension of the warning area 72 is not reduced and kept at Xd.

As illustrated in FIG. 5C, the warning area of the subject vehicle 40 is sized equal to the warning area 72 before it is determined that the turn of the subject vehicle 40 has been completed. The area 75 indicated by the broken line for the subject vehicle 40 indicates an extent of the warning area in a case where the warning area of the subject vehicle 40 is not reduced even after initiation of the turn. The area 75 extends to the rearward position of the subject vehicle 40 in the lane 61 that the subject vehicle 40 is traveling, and is set at an inadequate position. Thus, if a vehicle 41 following the subject vehicle 40 traveling in the lane 61 enters the area 75 and the warning area extends to the area 75, the vehicle 41 will be detected and a notification will be provided in response thereto. The reduced warning area 72 of the subject vehicle 40 can avoid the warning area from extending to the rearward position of the subject vehicle 40, which can suppress unnecessary notifications provided in response to the vehicle 41 being detected.

When the curve radius R of the subject vehicle 40 exceeds the completion-of-turn curve radius Re during turning of the subject vehicle 40, it is determined that the turn has been completed. Upon determining that the turn has been completed, a warning area 73 extending toward the subject vehicle 40 from the warning area 72 is added as the warning area for the subject vehicle 40, as illustrated in FIG. 5D. The dimension of the warning area 73 in the travel direction of the subject vehicle 40 is Yr and the dimension of the warning area 73 in the lateral direction of the subject vehicle 40 is Xd. Upon determining that the turn has been completed, the warning area of the subject vehicle 40 is expanded by the warning area 73.

The dimension Yr of the warning area 73 in the travel direction is increased as the current travel speed of the subject vehicle 40 increases, and the warning area 73 continues to be expanded in the Y-direction until Ys+Yr=Yd is met, finally providing the warning area 74 as illustrated in FIG. 5E. The dimensions of the warning area 74 and the positional relationship between the warning area 74 and the subject vehicle 40 are the same as in the case of the warning area 71. Since the subject vehicle 40 is traveling substantially along the lane 61 after it is determined that the turn has been completed, the warning area 73 is expanded substantially along the lane 61. Therefore, it is possible to avoid the warning area from being expanded behind the subject vehicle 40 in the lane 61. The warning area can timely and adequately be expanded while suppressing unnecessary notifications provided in response to detection of a vehicle 41, other than the subject vehicle 40, in the lane 61. The dimension Yr may be increased as the travel distance or the travel time traveled after a determination that the turn has been completed increases.

The case where the warning area is reduced along the travel direction of the subject vehicle 40 and then expanded and returned to the initially or originally sized warning area has been described with reference to FIG. 5. The directions of reduction and expansion are not limited these directions. For example, as indicated by the warning area 76 in FIG. 6A, the dimension in the lateral direction of the subject vehicle 40 may be reduced to Xs upon a determination that a turn has been initiated. Upon a determination that the turn has been completed, the dimension in the lateral direction of the subject vehicle 40 may be increased to Xr as indicated by the warning area 77 in FIG. 6B.

Figure 6A:
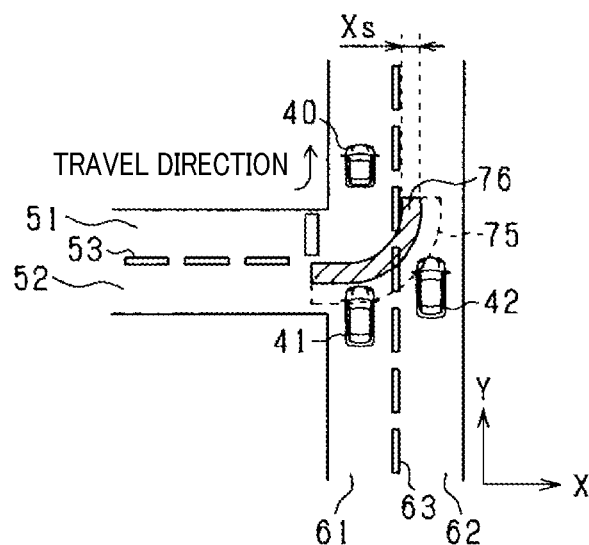
FIG. 6A is an illustration of warning area changes during turning of the subject vehicle.

As illustrated in FIG. 6A, although the warning area 76 extends to the rearward position of the subject vehicle 40 in the lane 61, the warning area 76 is reduced in a direction approaching the subject vehicle 40, which can suppress unnecessary notifications provided in response to detection of a vehicle 41 other than the subject vehicle 40. In addition, the warning area 76 is reduced in the lateral direction of the subject vehicle 40 in the lane 62, which can also suppress notifications provided in response to detection of a vehicle 42, other than the subject vehicle 40, traveling in the lane 62 and overtaking the subject vehicle 40 during turning of the subject vehicle 40.

Figure 6B:
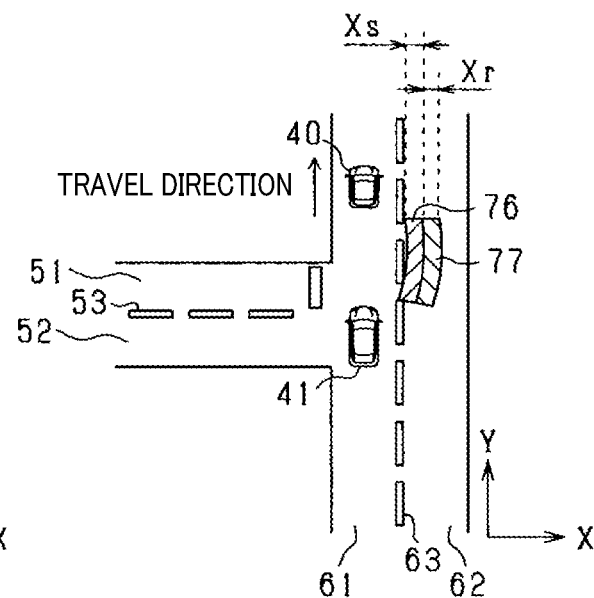
FIG. 6B is another illustration of warning area changes during turning of the subject vehicle.

In FIG. 6B, the dimension Xr is increased as the current travel speed of the subject vehicle 40 increases, and the warning area 77 continues to be expanded in the X-direction until Xs+Xr=Xd is met. Since the dimension Xr is increased as the travel speed of the subject vehicle 40 increases, the warning area can timely and adequately be expanded while suppressing unnecessary notifications provided in response to detection of the vehicle 41 other than the subject vehicle 40 in the lane 61 or the vehicle 42 other than the subject vehicle 40 in the lane 62. Like the dimension Yr in FIG. 5, the dimension Xr may be increased as the travel distance or the travel time traveled after a determination that the turn has been completed increases.

Figure 7A:
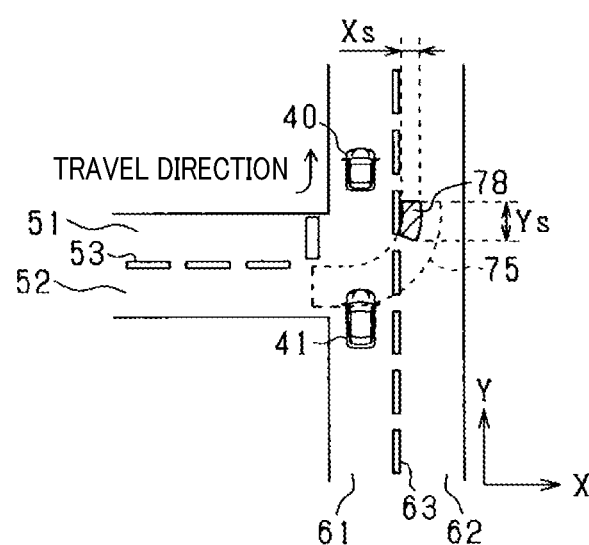
FIG. 7A is an illustration of warning area changes during turning of the subject vehicle.
Figure 7B:
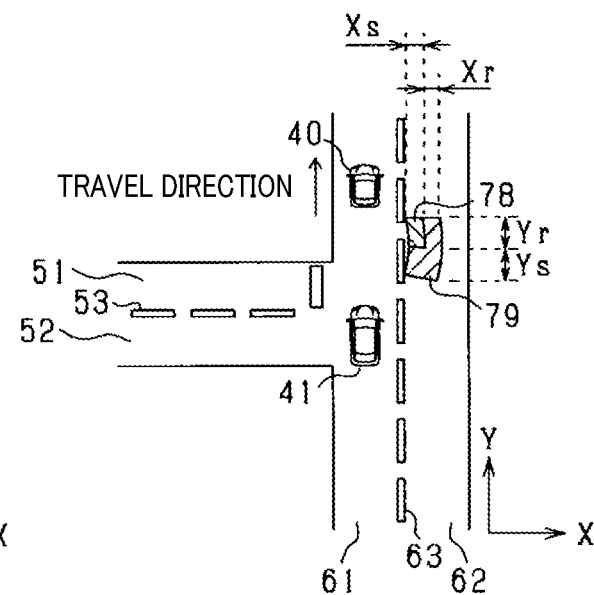
FIG. 7B is another illustration of warning area changes during turning of the subject vehicle.

As indicated by the warning area 78 in FIG. 7A, upon a determination that a turn has been initiated, the dimension in the travel direction of the subject vehicle 40 may be reduced to Ys and the dimension in the lateral direction of the subject vehicle 40 may be reduced to Xs. In such an embodiment, after a determination that the turn has been completed, the dimension in the travel direction of the subject vehicle 40 may be increased by Yr and the dimension in the lateral direction of the subject vehicle 40 may be increased by Xr, as indicated by the warning area 79 in FIG. 7B. As illustrated in FIG. 7A, the warning area 78 can avoid the warning area from extending to the rearward position of the subject vehicle 40 and is reduced in dimension in the lateral direction of of the subject vehicle 40 in the lane 62. This can suppress unnecessary notifications provided in response to detection of vehicles 41, 42, other than the subject vehicle 40. In addition, since the dimensions of the warning area 79 Yr, Xr, as illustrated in FIG. 7B, increase as the travel speed of the subject vehicle 40 increases, the warning area can timely and adequately be expanded while suppressing unnecessary notifications provided in response to detection of the vehicle 41 other than the subject vehicle 40 in the lane 61 or the vehicle 42 other than the subject vehicle 40 in the lane 62.

The embodiments described above can provide the following advantages.

The ECU 30 includes the object detector 33, the determiner 34, the area setter 35, the area changer 36, and the notifier 37. The object detector 33 detects an object on at least one of the left rear side and the right rear side of the subject vehicle 40. The area setter 35 sets the warning area 71-79 on at least one of the left rear side and the right rear side of the subject vehicle 40. The notifier 37 provides a notification in response to the object detector 33 detecting an object in warning area 71-79. When the subject vehicle 40 makes a turn at an intersection, the determiner 34 determines initiation and completion of the turn. In response to the determiner 34 determining the initiation of the turn, the area changer 36 reduces the warning area 71 in a direction approaching the subject vehicle 40. This can avoid a situation where the warning area extends to an inadequate area and thereby suppress unnecessary notifications related to other vehicles 41, 42 other than the subject vehicle 40. Further, in response to the determiner 34 determining the completion of the turn after a determination that the turn has been initiated, the area changer 36 expands the reduced warning area 72 or the like according to a traveling state (e.g., a travel speed, a travel distance or a travel time traveled after the completion of the turn) of the subject vehicle 40. That is, the reduced warning area is expanded in response to the traveling state of the subject vehicle 40 after a determination that the turn has been completed, which allows the warning area to be expanded timely and adequately while suppressing unnecessary notifications. With the driving assistance process performed by the ECU 30, throughout a time period from when the subject vehicle enters an intersection to when the subject vehicle leaves the intersection and returns to a normal traveling state, an object around the subject vehicle can adequately be detected, unnecessary notifications can be suppressed, and driving safety of the subject vehicle 40 can be ensured.

The area changer 36 may just change the warning area in a direction approaching the subject vehicle 40. For example, the area changer 36 may be configured to reduce the warning area 71 along the travel direction of the subject vehicle 40 in response to the determiner 34 determining that the turn has been initiated, and then expand the reduced warning area 72 along the travel direction of the subject vehicle 40 in response to the determiner 34 determining that the turn has been completed. Alternatively, for example, the area changer 36 may reduce the warning area 71 along the lateral direction of the subject vehicle 40 in response to the determiner 34 determining that the turn has been initiated, and then expand the reduced warning area 71 along the lateral direction of the subject vehicle 40 in response to the determiner 34 determining that the turn has been completed. Still alternatively, for example, the warning area may be reduced or expanded in both the travel direction and the lateral direction of the subject vehicle 40. The direction in which the warning area is reduced or expanded can adequately be set such that unnecessary detection and notification of a vehicle 41, other than the subject vehicle, following the subject vehicle 40 in the lane 61 or a vehicle 42, other than the subject vehicle, traveling in the lane 62 and overtaking the subject vehicle 40 during turning of the subject vehicle 40 can be suppressed.

The area changer 36 may be configured to, in response to the determiner 34 determining that the turn has been completed, expand the reduced warning area according to at least one of a travel distance, a travel time, a travel speed of the subject vehicle 40 after the completion of the turn. The larger the travel distance or the travel time traveled after the completion of the turn of the subject vehicle 40, or the higher the travel speed of the subject vehicle 40 after the completion of the turn of the subject vehicle 40, the more the warning area is expanded. This allows the warning area to be expanded before the subject vehicle 40 returns to the normal traveling state while avoiding unnecessary notifications.

Preferably, the area changer 36 may be configured to, in response to the determiner 34 determining that the turn has been completed, expand the reduced warning area 72 or the like up to the initially sized warning area 71 that applied before initiation of the turn was determined. Depending on the traveling state of the subject vehicle 40 at the time it is determined that the turn has been completed, the reduced warning area 72 or the like may be expanded to the initially sized warning area 71 immediately after it is determined that the turn has been completed.

The ECU 30 further includes a storage 32 which stores a turn curve history that is a history of the curve radius of the subject vehicle 40 during turning of the subject vehicle 40 at an intersection. The determiner 34 is configured to, based on the turn curve history, determine initiation and completion of the turn during turning of the subject vehicle 40 at the intersection. More specifically, initiation and completion of the turn are determined by comparing the initiation-of-turn curve radius Rs or the completion-of-turn curve radius Re set based on the turn curve history of the subject vehicle 40 with the current sensed value R of the curve radius of the subject vehicle 40. This enables a quick determination suitable for the current traveling state of the subject vehicle 40. As a result, it is possible to set or change the warning area suitable for the current traveling state of the subject vehicle 40.

While the present disclosure has been described with reference to the embodiments, it is understood that the present disclosure is not limited to such embodiments and structures. The present disclosure includes various modifications and modifications within the equivalent range. Additionally, various combinations and forms, as well as other combinations and forms including only one element, more or less, are within the scope and spirit of the present disclosure.

What is claimed is:

1. A driving assistance apparatus comprising:
   a non-transitory memory storing one or more computer programs; and
   a processor executing the one or more computer programs to:
   detect an object on at least one of a left rear side and a right rear side of a subject vehicle;
   set a warning area extending into a lane adjacent to a lane in which the subject vehicle is traveling, on at least one of the left rear side and the right rear side of the subject vehicle;
   provide a notification in response to detecting an object in the warning area;
   determine initiation of a turn and completion of the turn of the subject vehicle at an intersection; and
   in response to determining the initiation of the turn at the intersection, reduce the warning area in a direction approaching the subject vehicle, and in response to determining the completion of the turn at the intersection, expand the reduced warning area into a lane adjacent to a turn destination lane according to a traveling state of the subject vehicle after the completion of the turn at the intersection.

2. The driving assistance apparatus according to claim 1, wherein
   the processor further executes the one or more computer programs to, in response to determining the initiation of the turn at the intersection, reduce the warning area along a travel direction of the subject vehicle, and in response to determining completion of the turn at the intersection, expand the reduced warning area along the travel direction of the subject vehicle.

3. The driving assistance apparatus according to claim 1, wherein
   the processor further executes the one or more computer programs to, in response to determining the initiation of the turn at the intersection, reduce the warning area along a lateral direction of the subject vehicle, and in response to determining completion of the turn at the intersection, expand the reduced warning area along the lateral direction of the subject vehicle.

4. The driving assistance apparatus according to claim 1, wherein
   the processor further executes the one or more computer programs to, in response to determining completion of the turn at the intersection, expand the reduced warning area according to a travel distance traveled by the subject vehicle after completion of the turn at the intersection.

5. The driving assistance apparatus according to claim 1, wherein
   the processor further executes the one or more computer programs to, in response to determining completion of the turn at the intersection, expand the reduced warning area according to a travel time traveled by the subject vehicle after completion of the turn at the intersection.

6. The driving assistance apparatus according to claim 1, wherein
   the processor further executes the one or more computer programs to, in response to determining the completion of the turn at the intersection, expand the reduced warning area according to a travel speed of the subject vehicle after the completion of the turn at the intersection.

7. The driving assistance apparatus according to claim 1, wherein
   the processor further executes the one or more computer programs to, in response to determining the completion of the turn at the intersection, expand the reduced warning area up to an initially sized warning area that applied before initiation of the turn at the intersection was determined.

8. The driving assistance apparatus according to claim 1, further comprising a storage storing a turn curve history that is a history of a curve radius of the subject vehicle during turning of the subject vehicle at the intersection,
   wherein the processor further executes the one or more computer programs to, based on the turn curve history, determine initiation and completion of the turn at the intersection during turning of the subject vehicle at the intersection.

9. The driving assistance apparatus according to claim 1, wherein
   the processor further executes the one or more computer programs to, in response to determining the initiation of the turn at the intersection, reduce the warning area along both a travel direction and a lateral direction of the subject vehicle, and in response to determining completion of the turn at the intersection, expand the reduced warning area along both the travel direction and the lateral direction of the subject vehicle.

* * * * *